United States Patent [19]

Motoda

[11] Patent Number: 4,975,012
[45] Date of Patent: Dec. 4, 1990

[54] MECHANIZED STORAGE FACILITY

[75] Inventor: Kenro Motoda, Tokyo, Japan

[73] Assignee: Motoda Electronics Co. Ltd., Tokyo, Japan

[21] Appl. No.: 341,472

[22] Filed: Apr. 20, 1989

[30] Foreign Application Priority Data

May 17, 1988 [JP] Japan .................................. 63-64755

[51] Int. Cl.⁵ ................................................ B65G 1/04
[52] U.S. Cl. ..................... 414/279; 414/609; 414/273; 414/277; 414/286; 414/284; 109/1 R; 52/79.1; 52/169.6
[58] Field of Search ............... 414/609, 231, 267, 266, 414/268, 269, 270, 273, 275, 277, 278, 279, 280, 281, 282, 284, 286, 255, 256, 259, 260; 109/1 R; 52/79.1, 169.6

[56] References Cited

U.S. PATENT DOCUMENTS

| | | | |
|---|---|---|---|
| 3,148,785 | 9/1964 | Fauconnier | 414/232 X |
| 3,715,040 | 2/1973 | Polus et al. | 414/273 X |
| 3,817,406 | 6/1974 | Sawada et al. | 414/273 X |
| 4,459,078 | 7/1984 | Chiantella et al. | 414/284 X |
| 4,470,742 | 9/1984 | Schindler | 414/286 |
| 4,568,233 | 2/1986 | Baker et al. | 414/267 |
| 4,792,270 | 12/1988 | Yoshida | 414/277 X |
| 4,804,307 | 2/1989 | Motoda | 414/282 |

FOREIGN PATENT DOCUMENTS

| | | | |
|---|---|---|---|
| 1938473 | 4/1971 | Fed. Rep. of Germany | 414/282 |
| 2254421 | 5/1974 | Fed. Rep. of Germany | 414/282 |
| 81004 | 5/1982 | Japan | 414/282 |
| 277502 | 12/1986 | Japan | 198/347 |
| 1333745 | 10/1973 | United Kingdom | 414/266 |

Primary Examiner—Frank E. Werner

[57] ABSTRACT

A mechanized storage facility according to the present invention has a size which enables it to be moved from one place to another. The storage facility includes a box-shaped casing, an elevator device coupled to the casing, a plurality of storage units accommodated in the casing, a conveying car that travels within the casing to convey the storage unit between the casing and the elevator device, and a control device for controlling the operation of the conveying car and that of the elevator device. The interior of the storage unit is divided into a plurality of stages so as to form a plurality of accommodating portions each of which accommodates a storage box such as a strongbox. The elevator device includes an elevator tower and a lift provided in the elevator tower in such a manner that it can rise and fall. The elevator tower has an opening having a size equivalent to that of one of the plurality of accommodating portions. The storage unit is moved in the vertical direction by the lift so as to allow the objects to the conveyed to the opening. In consequence, in the small mechanized storage facility of this invention which is suitably used to store a small amount of objects, storage boxes such as strongboxes can be automatically stored or taken out.

4 Claims, 12 Drawing Sheets

F I G. 10
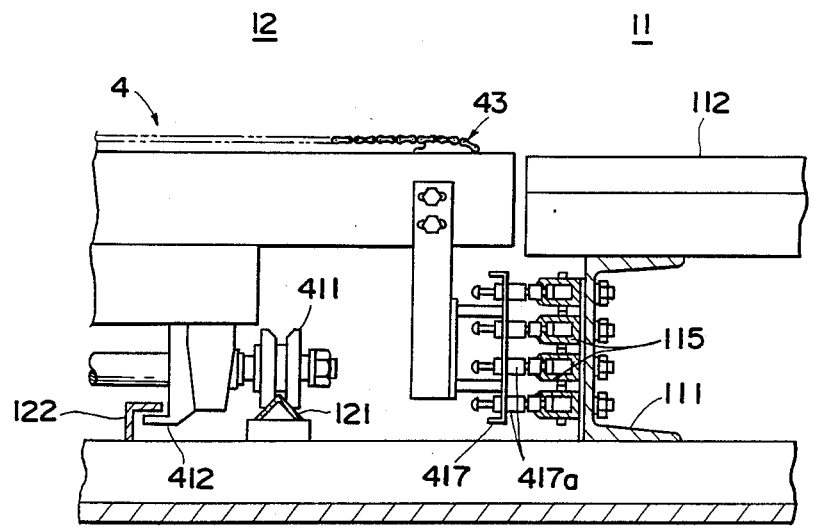

MECHANIZED STORAGE FACILITY

BACKGROUND OF THE INVENTION

1. Field of the Invention

The present invention relates to a mechanized storage facility.

2. Description of the Related Art

Mechanized storage facilities, in particular, mechanized storage facilities provided with fixed shelves, have originally been developed to store a very large amount of objects such as thousands of pallets of objects.

However, in places other than factories such as household, there has been an increasing demand for a small mechanized storage facility which is suitably used to store a small amount of objects.

Such small mechanized storage facilities require an object handling/storing system different from that employed in the conventional mechanized storage facility.

SUMMARY OF THE INVENTION

An object of the present invention is to provide a small mechanized storage facility which is compact and which employs an improved object handling/storing system.

To this end, the present invention provides a mechanized storage facility which has a size that enables it to be moved from one place to another, and which comprises: a box-shaped casing, an elevator device coupled to the casing, a plurality of storage units accommodated in the casing, a conveying car that travels within the casing to convey the storage unit between the casing and the elevator device, and a control device for controlling the operation of the conveying car and that of the elevator device. The casing and the elevator device may be manufactured as separate units which are small enough to be carried out from one place to another.

The interior of the storage unit is divided into a plurality of stages so as to form a plurality of accommodating portions. Although it is not necessary for a special storage device to be accommodated in the accommodating portion, in one example, a safe may be accommodated.

The elevator device includes an elevator tower and a lift which is provided in the elevator tower in such a manner that it can rise and fall. The elevator tower has an opening having a size equivalent to that of one of the accommodating portions. The lower portion of the elevator tower communicates with the passageway portion. The lift has supporting members used when the storage unit is lifted up from the conveying car, and a driving device that moves the supporting members in the vertical direction and stops them at a plurality of positions. The control device controls the operation of the driving device such that the storage unit is moved between the conveying car and the supporting members at the lowermost position and such that one of the plurality of accommodating portions faces the opening when the storage unit is located at the corresponding other position in the remaining positions.

The control device may be a microcomputer with an operation control program incorporated therein. It may also be of relay sequence type.

BRIEF DESCRIPTION OF THE DRAWINGS

FIG. 10 is an enlarged front view of the essential parts of the conveying car, showing a current collector structure of the conveying car;

FIG. 13 is a side elevational view, showing a state where the storage unit is pushed in;

DETAILED DESCRIPTION OF THE PREFERRED EMBODIMENTS

Figure 1:
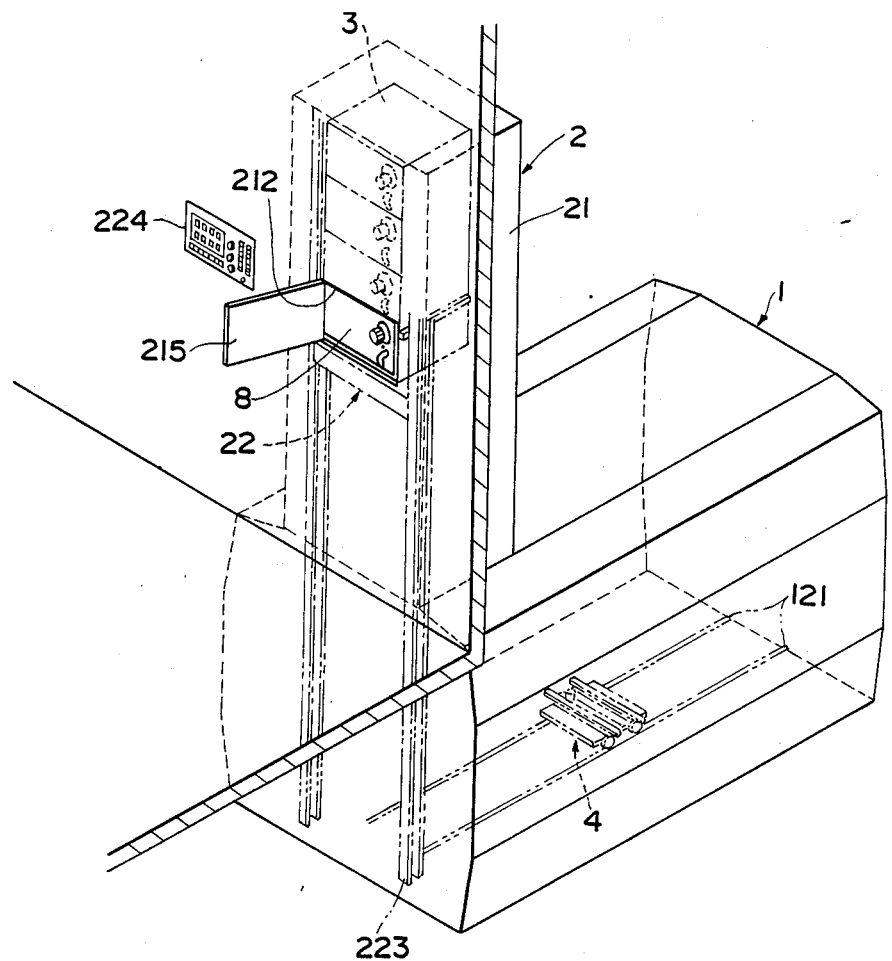
FIG. 1 is a perspective view of a storage facility, showing an embodiment of the present invention.

The present invention will not be described by way of example with reference to the accompanying drawings. First, a first embodiment of the present invention will be described with reference to FIGS. 1 to 16.

A mechanized storage facility of this embodiment, which may be a safe-deposit vault of a bank and so on, includes a box-shaped casing 1, an elevator device 2 coupled to one end of the casing 1, a plurality of storage units 3 accommodated in the casing 1, a conveying car 4 that travels in the casing 1 to convey the storage unit 3 between the casing 1 and the elevator device 2, and a control panel 224 with a control device for controlling the operation of the conveying car 4 and that of the elevator device 2 incorporated therein.

The mechanized storage facility has a size that enables it to be moved from one place to another. The casing 1 and the elevator device 2 are manufactured as separate units.

Figure 2:
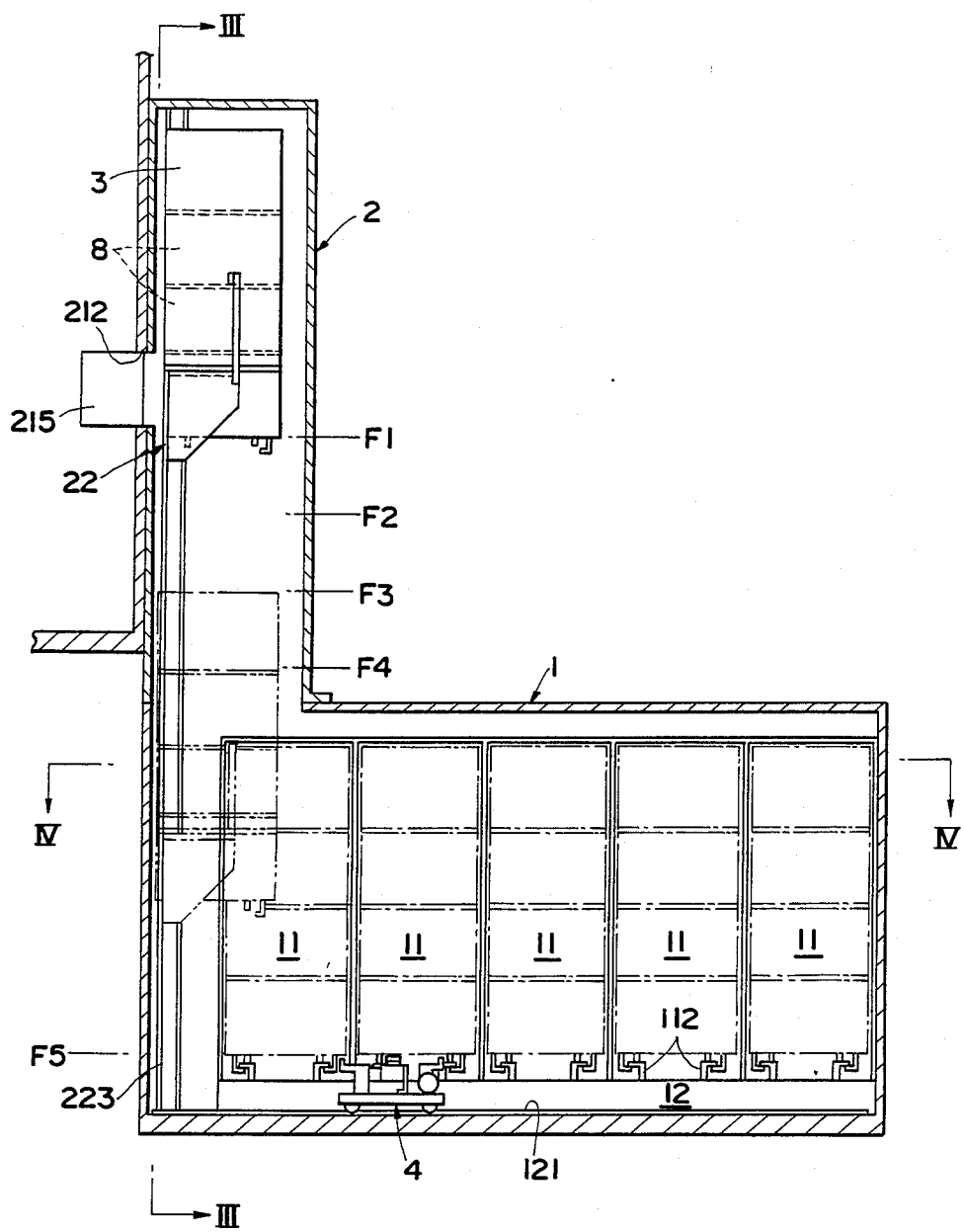
FIG. 2 is a vertical cross-sectional view taken along the line II—II of FIG. 1 and seen when looking in the direction indicated by the arrows.
Figure 3:
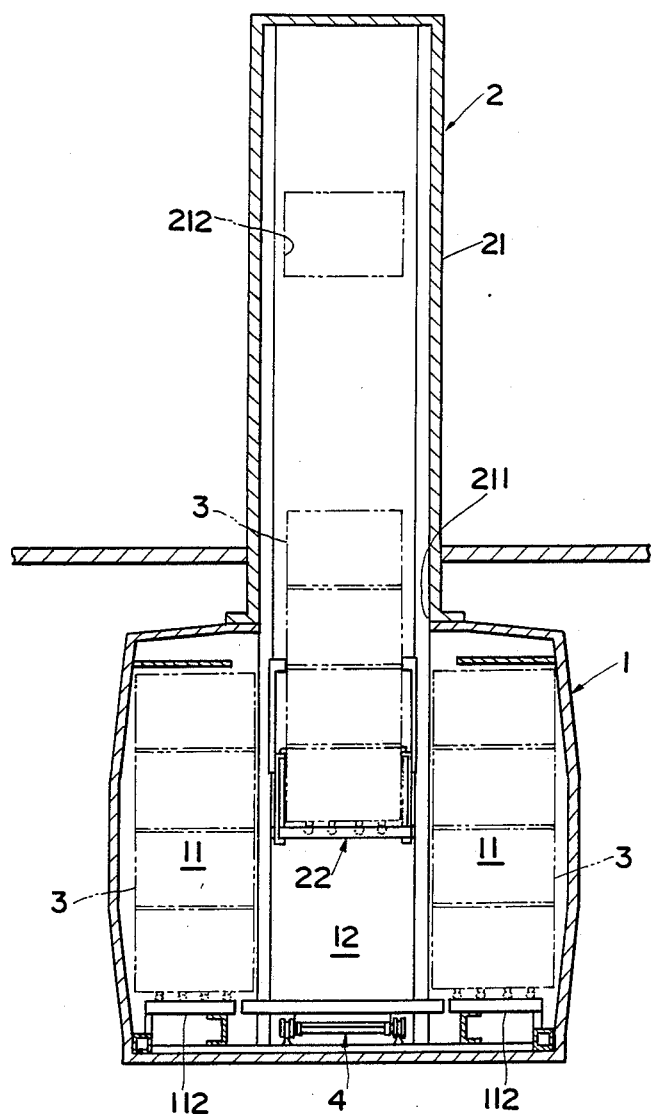
FIG. 3 is a vertical cross-sectional view taken along the line III—III of FIG. 2 and seen when looking in the direction indicated by the arrows.
Figure 4:
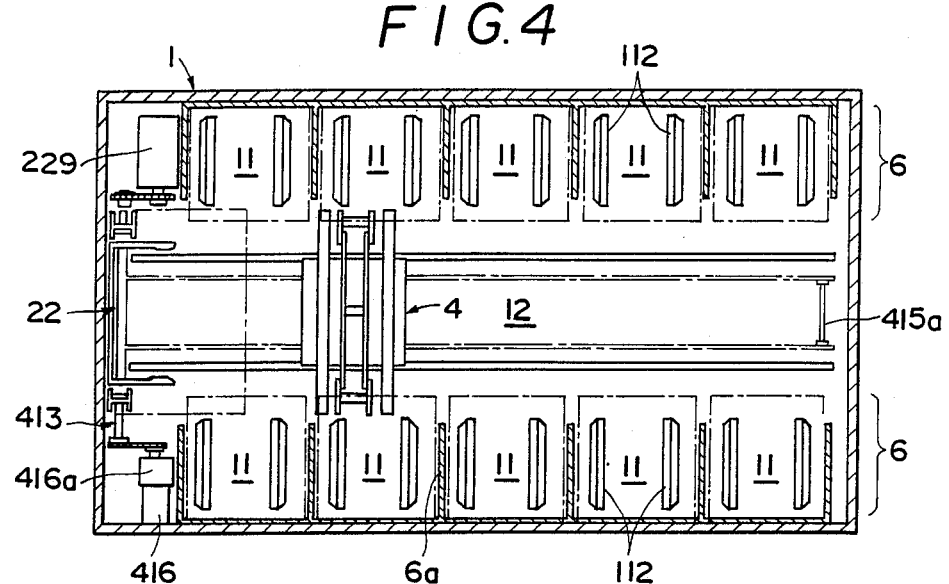
FIG. 4 is a cross-section taken along the line IV—IV of FIG. 2 as seen when looking in the direction indicated by the arrows.
Figure 5:
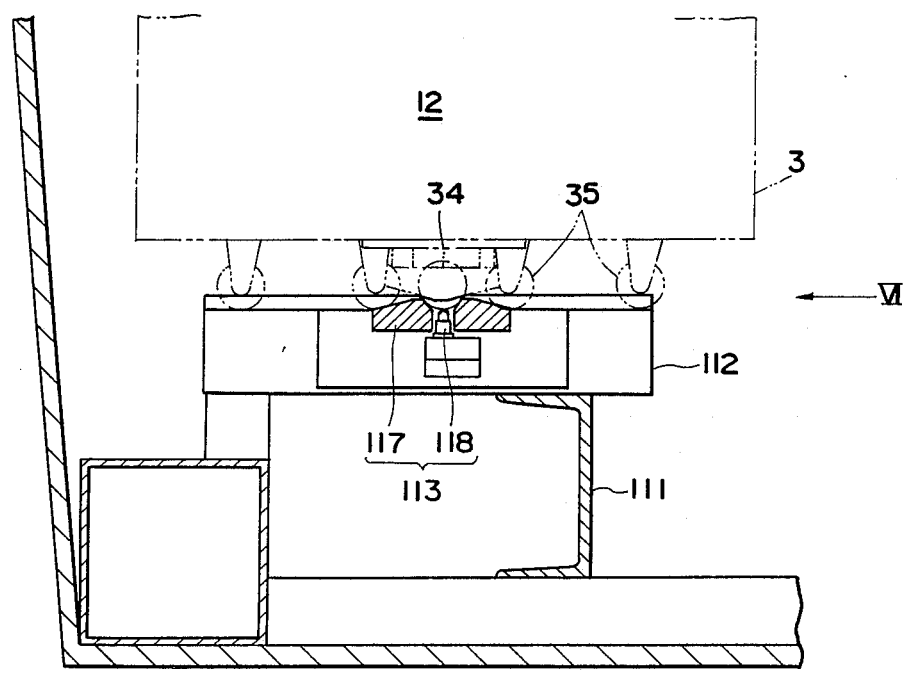
FIG. 5 is an enlarged vertical cross-sectional view of a storage portion formed in a casing.
Figure 6:
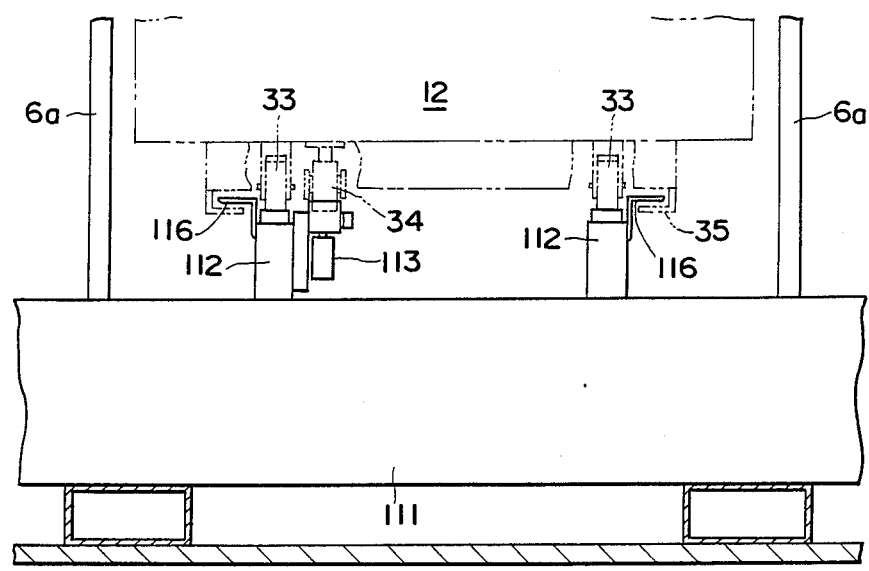
FIG. 6 is an enlarged front view of the storage portion as seen when looking in the direction indicated by the arrow VI of FIG. 5.

As shown in FIG. 1, substantially the entire casing 1 is buried in the earth under a floor 7a of a building with the top portion of the elevator device 2 protruding above the floor 7a in a wall 7b of the building. As shown in FIGS. 2 to 4, the interior of the casing 1 is divided into a storage area 6 and a passageway area 12. The storage area 6 is divided into a plurality of storage portions 11 that are aligned with each other in the longitudinal direction of the casing 1. In this embodiment, two rows of storage areas 6 oppose each other with the passageway area 12 being interposed therebetween. As stated above, the storage area 6 is divided into a plurality of storage portions 11 by partitioning walls 6a, and the storage portions 11 are aligned with each other.

On the floor of each of the storage portions 11 are provided a base frame 111 on which the storage unit 3 is placed as well as rails 112 on which the storage unit 3 run. A plurality of connectors 115 are provided on the side of the base frame 111 that faces the passageway portion 12 so as to enable power to be supplied to the conveying car 4. A travel guide 116 having an inverted L-shaped form is mounted on the outer side of each of the rails 112. A positioning device 113 is provided on the inner side of one of the rails 112 so as to allow the storage unit 3 to be located at a fixed position when the storage unit 3 is accommodated in the storage portion 11. Also, the positioning device 113 detects the presence of the storage unit 3 when it is located at that fixed position. The positioning device 113 includes a pair of cam guides 117, and a limit switch 118 with a detecting end protruding from between the two cam guides 117.

In the passageway area 12 are disposed a pair of rails 121 along which the conveying car 4 travels and a pair of guide rails 122.

Figure 7:
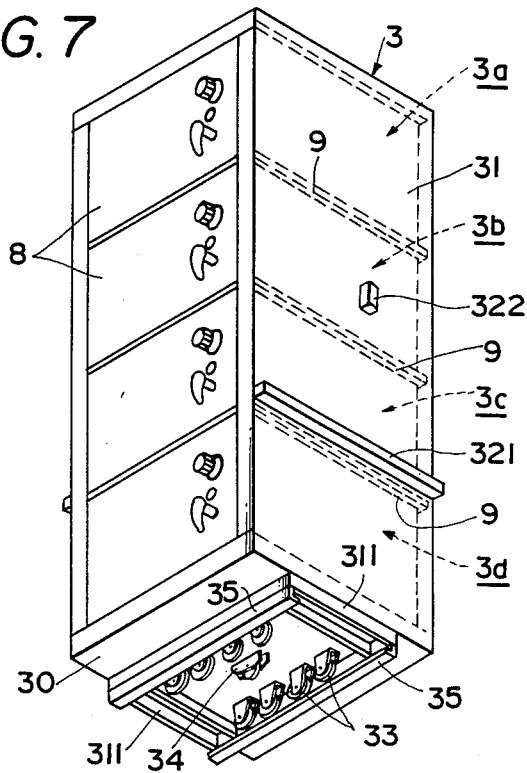
FIG. 7 is a perspective view of a storage unit.

The storage unit 3 has a hollow box-shaped form, as shown in FIG. 7. The interior of the storage unit 3 is divided into a plurality of stages by shelves 9 so as to form a plurality of accommodating portions 3a to 3d. Each of the accommodating portions 3a to 3d accommodates a strongbox 8. The storage unit 3 has a pair of downwardly protruding frames 311 formed on a bottom surface 30 thereof. On side walls 31 of the storage unit 3 are provided protrusions 321 with which the storage unit 3 is held when it is lifted by the elevator device 2, as well as guide protrusions 322 for guiding the storage unit 3 when it is lifted up.

On the bottom surface 30 of the storage unit 3 are also provided two rows of casters 33 with each row containing a plurality of casters, a positioning caster 34 between the two rows of casters 33, and travel guides 35 on the outer sides of the casters.

Figure 8:
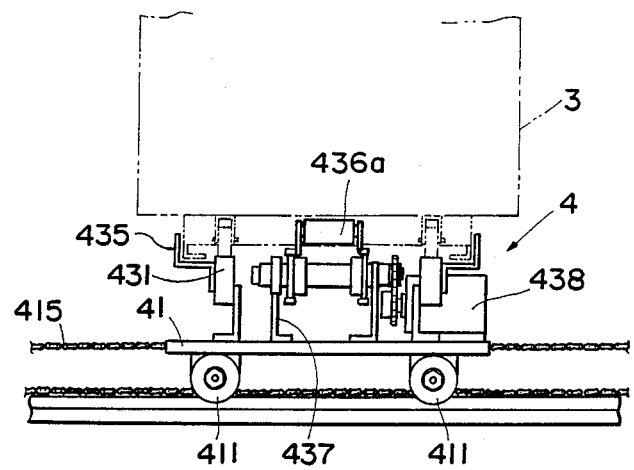
FIG. 8 is a side elevational view of a conveying car.
Figure 9:
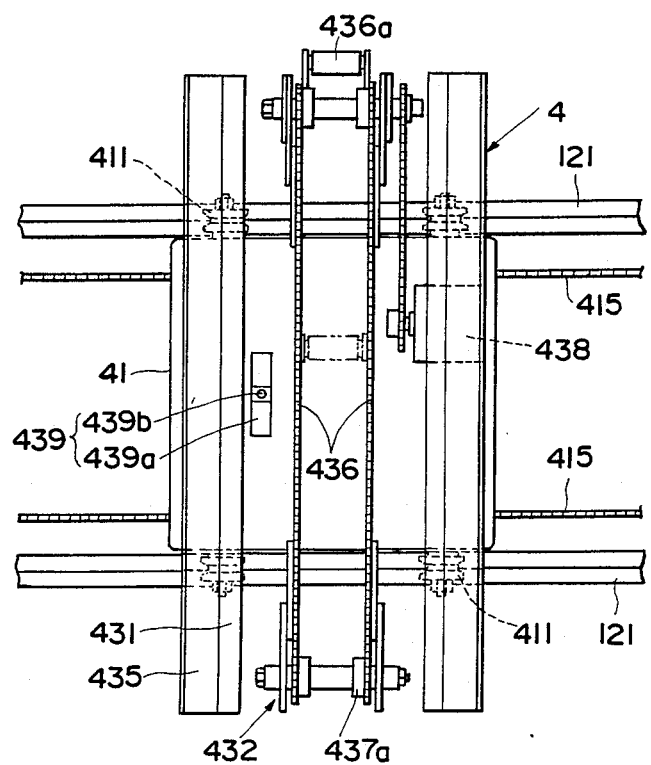
FIG. 9 is a plan view of the conveying car.
Figure 11:
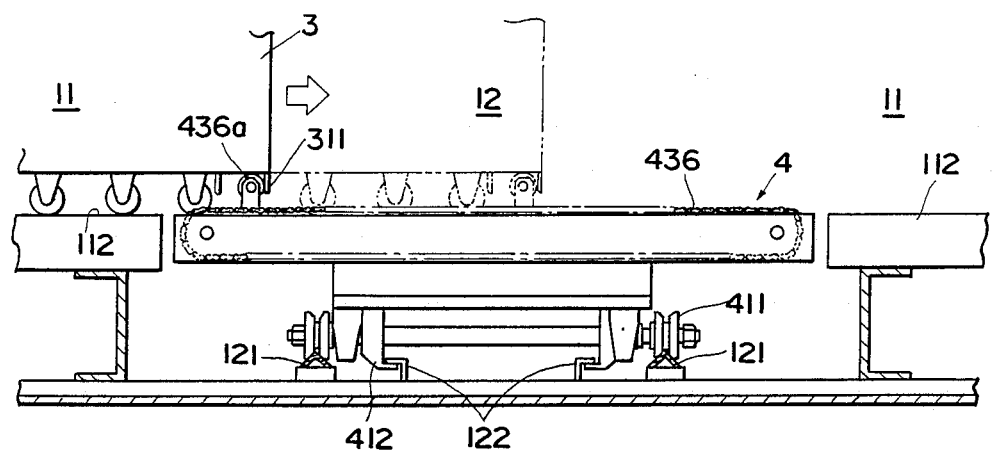
FIG. 11 is a side elevational view, showing a state where the storage unit is drawn out.
Figure 12:
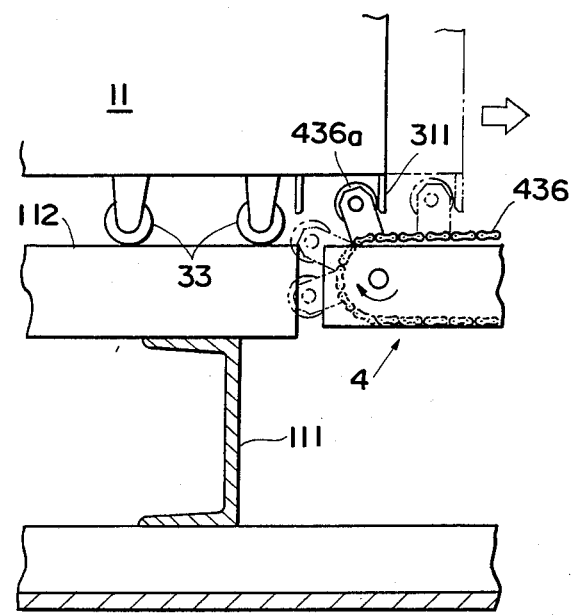
FIG. 12 is an enlarged side elevational view, showing the state where the storage unit is drawn out.
Figure 13:
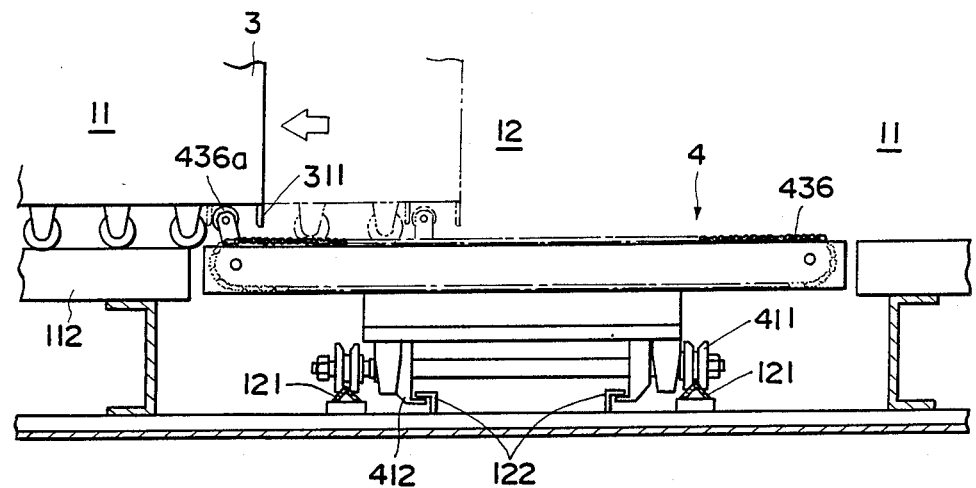
Figure 14:
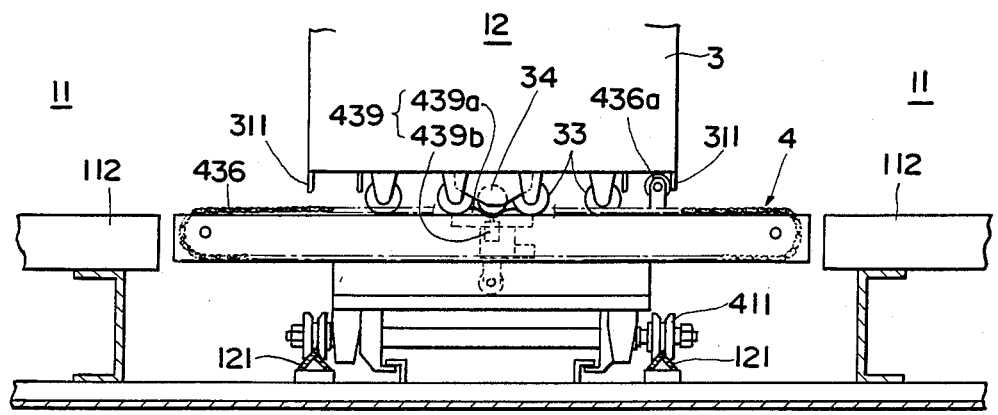
FIG. 14 is a front view of the transversely conveying device with the storage unit placed thereon.

As shown in FIGS. 8 and 9, the conveying car 4 includes a rectangular base 41, a travelling device 42 for moving the base 41 back and forth on the rails 121 in the passageway portion 12, and a transversely conveying device 43 for conveying the storage unit 3 substantially horizontally so as to draw it from the storage portion 11 and push it into the storage portion 11.

The travelling device 42 has travelling wheels 411, guides 412, and a driving device 413, which are provided on the undersurface of the base 41.

The driving device 413 has a wrapping connector driving device that employs a pair of chains 415 extending in the passageway portion 12 over the entire travelling region of the conveying car 4, a motor 415 accommodated in a space within an elevator tower 21 for driving the chains 415, and a collector plate 417 protruding downwardly from the base 41. The chains 415 are extended between sprockets 415a provided at the two longitudinal ends of the passageway portion 12, and are coupled to the front and rear ends of the base 41. The motor 416 is coupled to the chains 415 through a reduction gear 416a. A plurality of collectors 417a protrude from the collector plate 417 in the transverse direction in such a manner that the forward ends thereof engage with the connectors 115 provided on the base frame 11 of the casing 1.

The transversely conveying device 43 has rails 431, guide rails 435, and a driving device 432, which are provided on the base 41 of the conveying car 4.

The driving device 432 has a pair of chains 436 that move back and forth in the direction of the transverse movement of the storage unit 3, supporting bases 437 around which the chains 436 are wound, a motor 438 for driving the chains 436, and a positioning device 439 for allowing the storage unit 3 to be located at a fixed position on the conveying car 4 and for detecting that the storage unit 3 has been located at that fixed position. These components of the driving device 432 are all provided on the base 41.

A plurality of engaging rollers 436a are provided between the chains 436 at predetermined intervals. The roller portions of the engaging rollers 436a protrude externally. The supporting bases 436 are a pair of supporting sprockets 437a. The chains 436 extend between these sprockets 437a. The engaging roller 436a engages with the protruding frame 311 and thereby draws the storage unit from the storage portion 11 or pushes it into the storage portion 11.

The positioning device 439 has a pair of cam guides 439a, and a limit switch 439b. It is constructed and operated in the same manner as that in which the positioning device 113 in the storage portion 11 is constructed and operated. The conveying car 4 is provided with a current position detecting limit switch (not shown) which sends out a signal representing the current position to the control panel 224 when it makes contact with a contact member (not shown) provided in the passageway portion 12.

The elevator device 2 includes the elevator tower 21 and a lifter 22 disposed in the elevator tower 21. The elevator device 2 and the casing 1 are manufactured separately. They are combined to each other in such a manner that a lower opening 211 thereof communicates with the passageway portion 12 of the casing 1. The elevator tower 21 has an upper opening 212 in the upper portion thereof remote from the lower opening 211. The door of the strongbox 8 is opened and closed through this upper opening 212. The upper opening 212 has a size equivalent to one of the accommodating portions 3a to 3d. The upper opening 212 is provided with a door 215.

Figure 15:
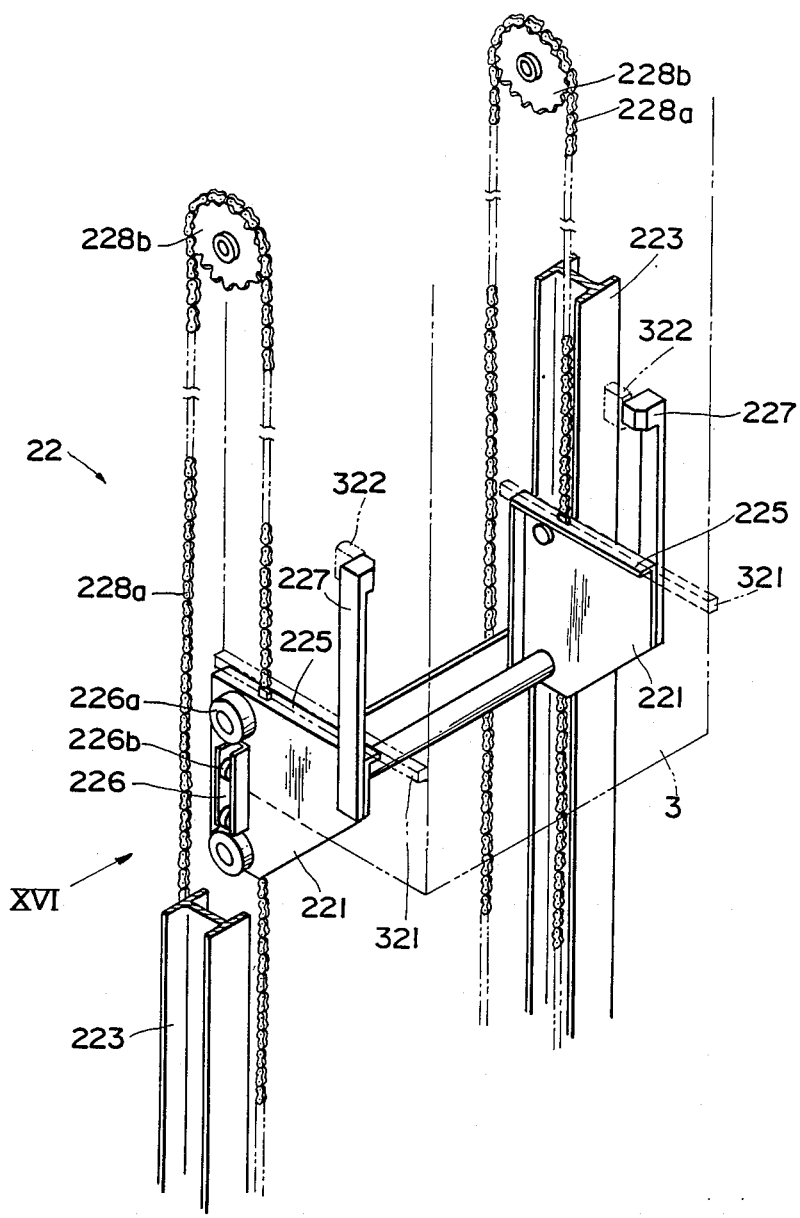
FIG. 15 is an enlarged perspective view of a lift of an elevator device.
Figure 16:
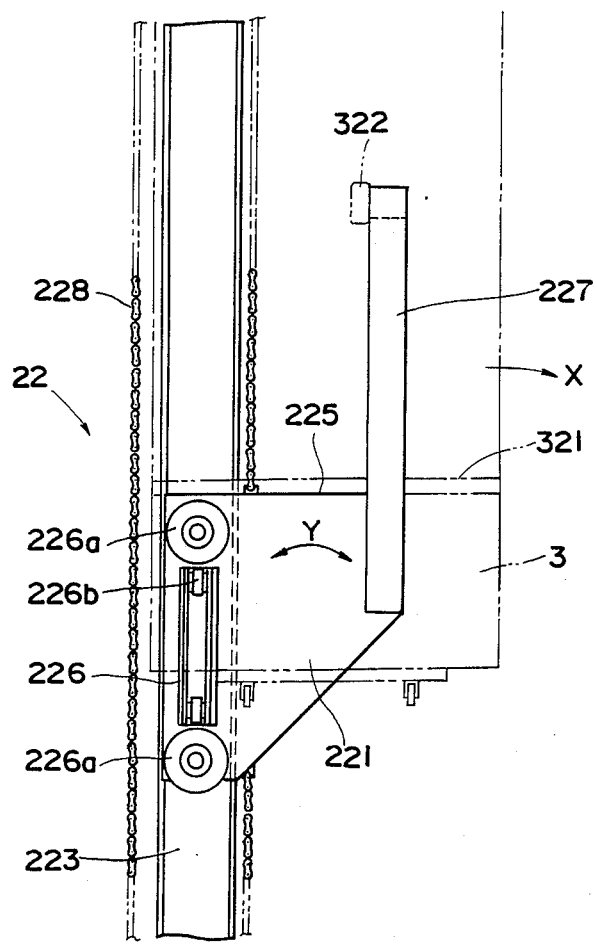
FIG. 16 is a side elevational view of the lift as seen when looking in the direction indicated by the arrow XVI of FIG. 15.

As shown in FIG. 15, the lifter 22 has a pair of holding plates 221 used to lift the storage unit 3, a driving device 222 for driving the holding plates 221, and a pair of guide rails 223 for guiding the movement of the holding plates 221.

The driving device 222 is a wrapping connector driving device that employs a pair of chains 228a and a motor 229 to raise and lower the holding plates 221. The chains 228a are extended between sprockets 228b disposed in the upper and lower portions of the elevator tower 21.

The holding plates 221 are coupled to each other by a coupling member 221a. Each of the holding plates 221 has a receiving edge 225 at the upper side thereof. A guide block 226 is fixed on the holding plate along the long lateral side, and a guide bar 227 protrudes upward from the short lateral side of the plate 221. The guide bars 227 make contact with the guide pins 322 provided on the storage unit 3 and support the storage unit 3 so that it does not fall in the direction indicated by the arrow X in FIG. 16 while it is being moved in the vertical direction.

Each of the guide blocks 226 has a pair of large-diameter rollers 226a and a pair of small-diameter rollers 226b. The guide plates have the function of preventing the swings of the holding plate 221 in the direction indicated by the arrows Y in FIG. 16 and of smoothly moving the holding plates 221 in the vertical direction.

A position detecting sensor (not shown) such as a limit switch is provided on the guide rail 223 at a suitable position so that the holding plates 221 can be stopped at any of a plurality of predetermined positions (FI to F5 shown in FIG. 2). F5 represents the lowermost position at which the storage unit 3 is carried between the lifter 22 and the conveying car 4. F1 to F4 represent the positions at which the accommodating portions 3a to 3d face the upper opening 212, respectively. In this embodiment, the storage unit 3 can be stopped at five positions including the lowermost position.

The elevator tower 21 may be disposed in the direction opposite from that in which it is provided in this embodiment so that the storage unit 3 can be moved downward from the casing 1. This allows the objects to be stored in the strongbox or taken out from the strongbox below the casing 1.

The control panel 224 is provided on the panel of the elevator tower 21 which is located above the upper opening 212. The control panel 224 incorporates a key board panel from which control data is input by an operator, and a microcomputer with the control program that operates the travelling device 42 and the transversely conveying device 43 of the conveying car 4 and the lifter 22 incorporated therein.

Next, the operation of this embodiment will be described.

First, power is supplied to the individual components so as to make the whole system ready for operation. The operator then inputs the number of the storage unit 3 which accommodates a desired strongbox 8 through the control panel 224. At this time, a conventional individual recognition technique is used.

Upon receipt of that instruction, the conveying car 4 travels on the rails 121 in the passageway portion 12 toward the assigned storage portion 11 Once the detection is made that the conveying car 4 has reached the assigned position, the conveying car 4 receives another instruction from the microcomputer incorporated in the control panel 224 and thereby stops.

Subsequently, the driving device 432 of the conveying car 4 is driven, the chains 436 are rotated, and the engaging roller 436a is engaged with the protruding frame 311 of the storage unit 3. As the chains 436 are further rotated, the storage unit 3 is drawn out from the storage portion 11 onto the conveying car 4 (see FIGS. 11 and 12).

Next, the conveying car 4 travels on the rails 121 again toward the elevator tower 21. When the detection is made that the conveying car 4 has passed the lower opening 211 and returned to the lifter 22, the conveying car 4 is stopped. In this state, the receiving edges 225 of the holding plates 221 are slightly below the protrusions 321 of the storage unit. As the chains 228a are driven so as to raise the holding plates 221, the receiving edges 225 make contact with the protrusion 321 from below and the storage unit 3 is thereby lifted up from the conveying car 4.

The storage unit 3 is lifted up without being tilted due to the engagement of the guide blocks 226 with the guide rails 223 and the contact of the guide bars 227 with the guide pins 322 provided on the storage unit 3. Once the desired strongbox 8 has been lifted to the upper opening 212 of the elevator tower 21, the chains 228a are stopped. The door 215 is then opened in this state to open the door of the safe deposit box 8 and to accommodate money and other valuables in the strongbox 8 and take them from the strongbox 8.

After the object handling operation has been completed, the operator gives an instruction of returning the storage unit 3 to the storage portion 11 through the control panel 224. The chains 228a of the lifter 22 thereby rotate in the opposite direction to lower the storage unit 3 and place it on the conveying car 4. The conveying car 4 with the storage unit 3 thereon travels in the casing 1 and then stops in front of the storage portion 11 to which the storage unit 3 belongs.

Once the conveying car 4 has been stopped, the storage unit 3 is pushed into the storage portion 11 in the procedure reverse to that in which it is drawn out. The microcomputer in the control panel 224 then detects that the storage unit 3 has been located in the storage portion 11 at the predetermined position, and this completes the accommodating operation of the storage unit 3.

Figure 17:
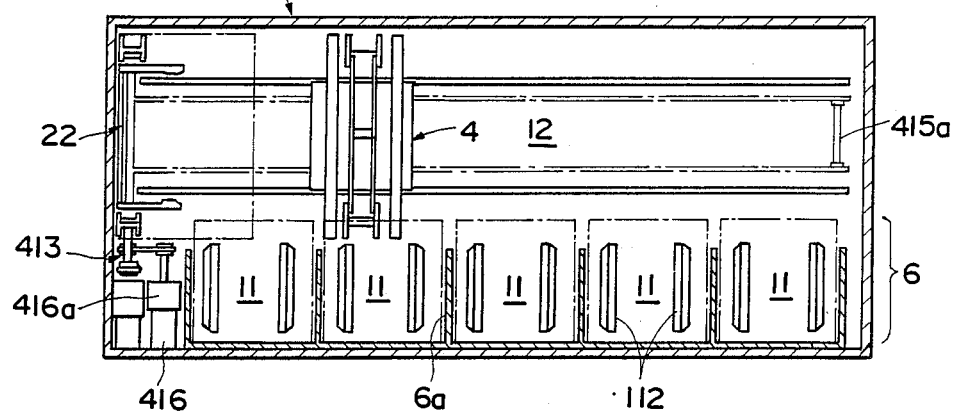
FIG. 17 is a view similar to FIG. 4, showing another example of a casing in which one row of storage portions are provided.

The storage area 6 in the casing 1 may also be formed in one row, as shown in FIG. 17. Further, the interior of the casing 1 may be divided into a plurality of blocks, these blocks being coupled to each other.

Figure 18:
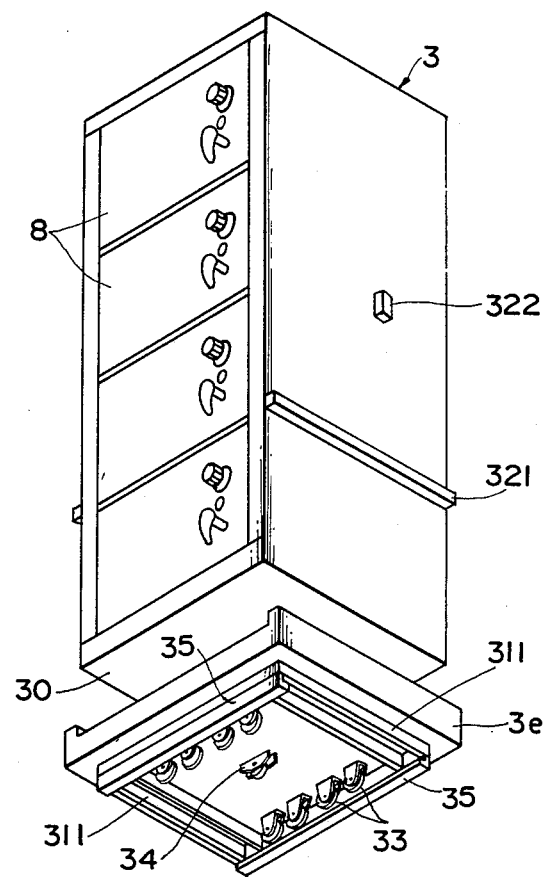
FIG. 18 is a view similar to FIG. 7, showing another example of a storage unit with a car provided separately.

As shown in FIG. 18, the protruding frames 311, the casters 33, the positioning caster 34, the guides 35 may be provided on a car 3b provided separately from the storage unit 3 so as to facilitate the conveyance of the storage unit to the outside of the casing 1. Further, if the storage unit 3 is not very large or heavy, a storage unit 3 without travelling means such as casters may be placed on the rails 112. In that case, if rollers are provided on the rails 112 of the storage portion 11, drawing and accommodation of the storage unit can be facilitated. Further, the door of the storage unit 3 may not be provided on the side surface thereof but on the upper surface. Alternatively, only an opening may be provided so that the objects can be taken out or put into the storage unit therethrough.

What is claimed is:

1. A mechanized storage facility having a size which enables it to be moved from one place to another when not in use, and which satisfies the following requirements, comprising:

a box-shaped casing having a longitudinal passageway separating two rows of opposed storage areas and a pair of rails arranged in said passageway, an elevator device coupled to said casing, a plurality of box-shaped storage units accommodated in the storage areas in said casing, a conveying car that travels on said rails within said casing to convey said storage unit between said casing and said elevator device, motor means for moving said conveying car on said rails, and a control device for controlling the operation of said conveying car and that of said elevator device, wherein said storage unit is provided with a plurality of shelves by which the storage unit is divided into a plurality of stages to form a plurality of vertically disposed accommodating portions in the storage unit, wherein said elevator device includes an elevator tower and a lift which is provided in said elevator tower in such a manner that it can rise and fall, said elevator tower having an upper opening having a size equivalent to that of one of said accommodating portions, and the lower portion of said elevator tower communicating with said passageway portion of said casing and wherein said lift has supporting members which are used to engage said storage unit when said storage unit is lifted up from said conveying car, and to disengage from said storage unit when said storage unit is at rest on said conveying car, and a driving device that moves said supporting members in the vertical direction and stops them at a plurality of predetermined positions including a lowermost position at which said storage unit can be conveyed between said casing and said elevator device, and positions at which respective accommodating portions are opposite the upper tower opening.

2. A mechanized storage facility according to claim 1, wherein said casing and said elevator device are manufactured as separate units which are adapted to be coupled together said casing and said elevator device being coupled to each other at a location of use.

3. A mechanized storage facility according to either of claims 1 or 2, wherein each of said accommodating portions accommodates a storage box.

4. A mechanized storage facility according to claim 3, wherein said storage box is a strongbox.

* * * * *